(12) United States Patent
Gong

(10) Patent No.: US 10,021,497 B2
(45) Date of Patent: Jul. 10, 2018

(54) METHOD FOR SELECTING A MICROPHONE AND APPARATUS AND COMPUTER STORAGE MEDIUM

(71) Applicant: ZTE Corporation, Shenzhen, Guangdong (CN)

(72) Inventor: Yong Gong, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/504,449

(22) PCT Filed: Jan. 23, 2015

(86) PCT No.: PCT/CN2015/071477
§ 371 (c)(1),
(2) Date: Feb. 16, 2017

(87) PCT Pub. No.: WO2015/131706
PCT Pub. Date: Sep. 11, 2015

(65) Prior Publication Data
US 2017/0238109 A1     Aug. 17, 2017

(30) Foreign Application Priority Data

Aug. 20, 2014 (CN) .......................... 2014 1 0413681

(51) Int. Cl.
*H04R 3/00* (2006.01)
*H04R 29/00* (2006.01)
(Continued)

(52) U.S. Cl.
CPC ............ *H04R 29/005* (2013.01); *G01S 15/08* (2013.01); *G10L 21/0216* (2013.01);
(Continued)

(58) Field of Classification Search
CPC .... H04R 3/00; H04R 3/005; H04R 2201/401; H04R 2420/07; H04R 2430/20;
(Continued)

(56) References Cited

U.S. PATENT DOCUMENTS 8,189,818 B2 * 5/2012 Takahashi .............. H04R 1/406
                                                        381/122
8,787,113 B2 * 7/2014 Turbahn ................ G06F 3/0346
                                                        367/118
(Continued)

FOREIGN PATENT DOCUMENTS

CN          1905763 A      1/2007
CN         102800323 A    11/2012
(Continued)

OTHER PUBLICATIONS

Supplementary European Search Report in European application No. 15758665.2, dated Aug. 3, 2017, 9 pgs.
(Continued)

*Primary Examiner* — Thang Tran
(74) *Attorney, Agent, or Firm* — Cooper Legal Group, LLC

(57) ABSTRACT

A method, apparatus and a computer storage medium for selecting a microphone are disclosed. The method includes: employing ultrasonic measurement to determine a microphone, which is closest to a primary sound source, of a matrix of a plurality of microphones arranged in a device for recording sound; and taking the microphone which is closest to the primary sound source as the current primary microphone and taking other microphones of the matrix of the plurality of microphones as secondary microphones, wherein the primary microphone is used to collect the primary sound source, and the secondary microphones are used to collect ambient noise.

17 Claims, 2 Drawing Sheets

(51) Int. Cl.
  *G01S 15/08* (2006.01)
  *G10L 21/0216* (2013.01)
(52) U.S. Cl.
  CPC .... *H04R 3/005* (2013.01); *G10L 2021/02166* (2013.01); *H04R 2201/401* (2013.01); *H04R 2410/05* (2013.01)
(58) Field of Classification Search
  CPC ....... H04R 29/005; H04R 5/027; G01S 15/08; G10L 2021/02166; G10L 21/0216; H04S 7/303
  See application file for complete search history.

(56) References Cited

U.S. PATENT DOCUMENTS

| | | | |
|---|---|---|---|
| 9,571,925 B1* | 2/2017 | Adva Fish | H04R 1/406 |
| 2008/0232608 A1* | 9/2008 | Ullmann | G01S 15/04 |
| | | | 381/77 |
| 2008/0312918 A1 | 12/2008 | Kim | |
| 2009/0262604 A1* | 10/2009 | Funada | G01S 5/30 |
| | | | 367/127 |
| 2010/0281984 A1* | 11/2010 | Ko | G06F 3/03545 |
| | | | 73/632 |
| 2011/0222698 A1* | 9/2011 | Asao | G10K 11/1784 |
| | | | 381/71.1 |
| 2012/0224456 A1 | 9/2012 | Visser | |
| 2013/0222230 A1* | 8/2013 | Choi | G06F 3/167 |
| | | | 345/156 |
| 2013/0272096 A1 | 10/2013 | Pandharipande | |
| 2013/0343560 A1 | 12/2013 | Liu et al. | |
| 2017/0180527 A1* | 6/2017 | Yang | H04M 1/03 |

FOREIGN PATENT DOCUMENTS

| | | |
|---|---|---|
| CN | 102800325 A | 11/2012 |
| CN | 103079148 A | 5/2013 |
| CN | 104270489 A | 1/2015 |
| GB | 2431543 A | 4/2007 |

OTHER PUBLICATIONS

International Search Report in international application No. PCT/CN2015/071477, dated May 22, 2015, 2 pgs.
English Translation of the Written Opinion of the International Search Authority in international application No. PCT/CN2015/071477, dated May 22, 2015, 7 pgs.

* cited by examiner

Device for recording sound                    Sound source

METHOD FOR SELECTING A MICROPHONE AND APPARATUS AND COMPUTER STORAGE MEDIUM

TECHNICAL FIELD

Embodiments of the disclosure relate to the field of computer technologies, and in particular, to a method, apparatus and a computer storage medium for selecting a microphone.

BACKGROUND

As information increases explosively nowadays, the use of voice technologies for providing assistance in living and learning has become an important development direction. By collecting voices and synchronously converting voices into words with the use of a network or the like, working efficiency is greatly increased. Similarly, by means of a voice technology, our hands can be freed to do other things. Voice is a critical factor for our life, and the deep exploring on voice also has become an important development direction.

Convenience is brought by the applications of voice technologies, and accordingly, various new application experiences are brought. When combining with a voice technology, a smart phone can free the hands of the user so that the user can deal with other things while being occupied by the smart phone, providing a wider use range. These application scenarios have achieved relatively excellent user experience. With the use of voice collector, more application scenarios are attainable.

Domestic and foreign enterprises have developed numerous voice collectors, varying from professional sound recording pens to portable voice collectors used together with a smart phone. No matter which method and which design principle are adopted, how to use a voice-collecting Microphone (MIC) highly effectively is always crucial. Especially in a complicated environment, it is extremely critical to select an optimal microphone for voice collection, especially for collecting voice at a distance.

In the conventional art, a matrix of a plurality of microphones is often deployed in a device for recording sound to collect sounds. A microphone of the matrix of the plurality of microphones functions as a primary microphone for collecting a needed sound while the other microphones function as secondary microphones for collecting ambient noise. The combination of the primary microphone and the secondary microphones efficiently processes the sounds to be collected and then realizes the secondary development and application of sounds. When the holder of a device for recording sound makes a primary microphone away from a voice source because the holder is fatigue or because of other reasons, then the voice signal received by the primary microphone is weak, and those received by secondary microphones will be wrongly taken as ambient noise. In this case, the efficiency of the processing of an audio algorithm on the voice signals collected is reduced, and an error may even occur.

SUMMARY

To this end, the disclosure is intended to provide a method, apparatus and a computer storage medium for selecting a microphone to at least partially address the problem that a primary microphone cannot be selected correctly.

In a first aspect of embodiments of the disclosure, a method for selecting a microphone is provided which includes:

employing ultrasonic measurement to determine a microphone, which is closest to a primary sound source, of a matrix of a plurality of microphones arranged in a device for recording sound; and taking the microphone which is closest to the primary sound source as the current primary microphone and taking other microphones of the matrix of the plurality of microphones as secondary microphones, wherein the primary microphone is used to collect the primary sound source, and the secondary microphones are used to collect ambient noise.

Based on the foregoing solution, before the step of employing ultrasonic measurement to determine a microphone, which is closest to a primary sound source, of a matrix of a plurality of microphones arranged in a device for recording sound, the method for selecting a microphone further includes:

using the microphone located in the middle of the matrix of the plurality of microphones as the current primary microphone during an initialization process; and detecting, by an audio processing module, whether an audio signal is collected by the current primary microphone, and when determining that an audio signal is collected by the current primary microphone, initiating, by the current primary microphone, an ultrasonic measurement.

Based on the foregoing solution, the step employing ultrasonic measurement to determine a microphone, which is closest to a primary sound source, of a matrix of a plurality of microphones arranged in a device for recording sound specifically includes:

sending, by an ultrasonic generator arranged in the device for recording sound, an ultrasonic signal, and receiving, by each microphone of the matrix of the plurality of microphones, an ultrasonic signal returned from the primary sound source, and determining the microphone which is closest to the primary sound source according to the moment the ultrasonic signal is sent and the moment the ultrasonic signal returned from the primary sound source is received by each of the plurality of microphones; or sending, by the ultrasonic generator arranged in the device for recording sound, an ultrasonic signal, and receiving, by each microphone of the matrix of the plurality of microphones, an ultrasonic signal returned from the primary sound source, and determining the microphone, which receives the ultrasonic signal returned from the primary sound source first, as the microphone which is closest to the primary sound source.

Based on the foregoing solution, the ultrasonic generator is located in the middle of the matrix of the plurality of microphones, the ultrasonic receiving part of each microphone is within a range in which the ultrasonic can be sent and received; and when the device for recording sound is arranged in a mobile terminal, a speaker of the mobile terminal serves as the ultrasonic generator.

Based on the foregoing solution, when the microphones of the matrix of the plurality of microphones are capable of receiving the ultrasonic signal, the microphones function as ultrasonic receivers; and when the microphones of the matrix of the plurality of microphones are incapable of receiving the ultrasonic signal, an ultrasonic receiver is arranged on each microphone of the matrix of the plurality of microphones.

Based on the foregoing solution, after the step of taking the microphone which is closest to the primary sound source as the current primary microphone and taking other microphones of the matrix of the plurality of microphones as secondary microphones, the method further includes:

detecting, by the audio processing module, whether an audio signal is collected by the current primary microphone, and when determining that no audio signal is collected by the current primary microphone and a sound recording process is not ended, initiating, by the current primary microphone, an ultrasonic measurement to reselect a primary microphone.

In a second aspect of embodiments of the disclosure, an apparatus for selecting a microphone is provided which includes:

an ultrasonic measurement module arranged to employ ultrasonic measurement to determine a microphone, which is closest to a primary sound source, of a matrix of a plurality of microphones arranged in a device for recording sound; and a selection module arranged to take the microphone which is closest to the primary sound source as the current primary microphone and take other microphones of the matrix of the plurality of microphones as secondary microphones, wherein the primary microphone is used to collect the primary sound source, and the secondary microphones are used to collect ambient noise.

Based on the foregoing solution, the apparatus further includes:

an initialization module arranged to use the microphone located in the middle of the matrix of the plurality of microphones as the current primary microphone during an initialization process; and an audio processing module arranged to detect whether an audio signal is collected by the current primary microphone, and when determining that an audio signal is collected by the current primary microphone, initiate an ultrasonic measurement via the current primary microphone.

Based on the foregoing solution, the ultrasonic measurement module is arranged to cause an ultrasonic generator arranged in the device for recording sound to send an ultrasonic signal and cause each microphone of the matrix of the plurality of microphones to receive an ultrasonic signal returned from the primary sound source, and determine the microphone which is closest to the primary sound source according to the moment the ultrasonic signal is sent and the moment the ultrasonic signal returned from the primary sound source is received by each of the plurality of microphones, or cause the ultrasonic generator arranged in the device for recording sound to send an ultrasonic signal and cause each microphone of the matrix of the plurality of microphones to receive an ultrasonic signal returned from the primary sound source and determine the microphone, which receives the ultrasonic signal returned from the primary sound source first, as the microphone which is closest to the primary sound source.

Based on the foregoing solution, the ultrasonic generator is located in the middle of the matrix of the plurality of microphones, the ultrasonic receiving part of each microphone is within a range in which the ultrasonic can be sent and received; and when the device for recording sound is arranged in a mobile terminal, a speaker of the mobile terminal serves as the ultrasonic generator.

Based on the foregoing solution, when the microphones of the matrix of the plurality of microphones are capable of receiving the ultrasonic signal, the microphones serve as ultrasonic receivers; and when the microphones of the matrix of the plurality of microphones are incapable of receiving the ultrasonic signal, an ultrasonic receiver is arranged on each microphone of the matrix of the plurality of microphones to receive the ultrasonic signal.

Based on the foregoing solutions, the audio processing module is further arranged to detect whether an audio signal is collected by the current primary microphone after the selection module takes the microphone which is closest to the primary sound source as the current primary microphone and takes other microphones of the matrix of the plurality of microphones as secondary microphones, and when determining that no audio signal is collected by the current primary microphone and a sound recording process is not ended, cause the current primary microphone to initiate an ultrasonic measurement to reselect a primary microphone.

In accordance with a third aspect of the disclosure, a computer storage medium is provided which having stored computer-executable instructions for executing at least one of the methods provided in the first aspect of embodiments of the disclosure.

According to the method, apparatus and computer medium for selecting a microphone in the embodiments of the disclosure, the microphone, which is determined to be the closest microphone to a speaker through an ultrasonic measurement, is used as a primary microphone and other microphones are used as microphones for collecting ambient noise, and the ambient noise is deliberately reduced. As such, the problem existing in the conventional art that a primary microphone cannot be selected correctly in a complicated environment can be addressed. Accordingly, an optimal microphone can be selected for voice collection in a complicated environment, and the efficiency of a subsequent audio algorithm can be improved.

DETAILED DESCRIPTION

Exemplary embodiments of the disclosure will be described in detail with reference to accompanying drawings. Although the exemplary embodiments of the disclosure are shown in accompanying drawings, it is to be appreciated that the disclosure can be embodied in various forms but not limited to embodiments described herein. Contrarily, the embodiments are provided for a more thorough understanding of the disclosure and a complete expression of the scope of the disclosure to those of skilled in the art.

To address the problem existing in the conventional art that a primary microphone cannot be selected correctly in a complicated environment, a method and apparatus for selecting a microphone are provided in the embodiments of the disclosure to dynamically select a microphone as a primary microphone for collecting a voice signal needing processing and use other microphones as secondary microphones for collecting ambient noise. The embodiments of the disclosure are described below in detail with reference to embodiments when read in conjunction with accompanying drawings. It is to be appreciated that the specific embodiments described herein are merely illustrative, but are not to be construed as limiting the embodiments of the disclosure.

Embodiment of Method

Figure 1:
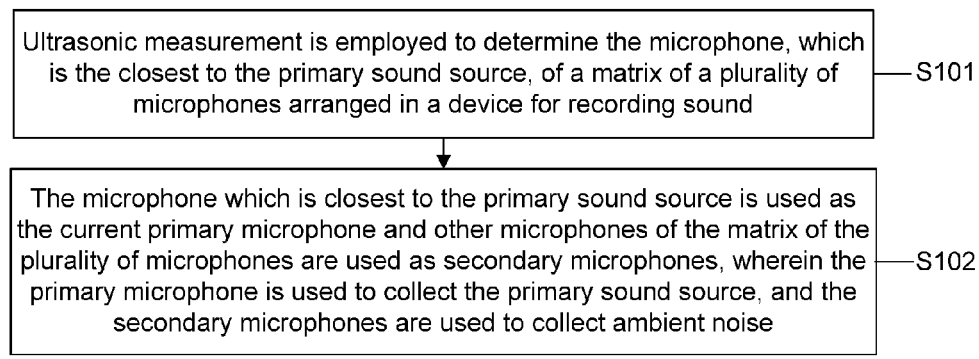
FIG. 1 is a flowchart illustrating the method for selecting a microphone provided in an embodiment of the disclosure.

According to an embodiment of the disclosure, a method for selecting a microphone is provided. FIG. 1 is a flowchart illustrating the method for selecting a microphone disclosed in the embodiments of the disclosure. As shown in FIG. 1, the method for selecting a microphone disclosed in the embodiments of the disclosure includes the following steps.

In Step S101, ultrasonic measurement is used to determine the microphone of a matrix of a plurality of microphones arranged in a device for recording sound.

In the embodiment, before Step S101 is executed, the microphone located in the middle of the matrix of the plurality of microphones is used as the current primary microphone during an initialization process. An audio processing module detects whether an audio signal is collected by the current primary microphone. The current primary microphone initiates the ultrasonic measurement after the audio processing module determines that an audio signal is collected by the current primary microphone.

Step S101 specifically includes the following processing: sending, by an ultrasonic generator arranged in the device for recording sound, an ultrasonic signal and receiving, by each microphone of the matrix of the plurality of microphones, an ultrasonic signal returned from the primary sound source, and determining the microphone which is closest to the primary sound source according to the moment the ultrasonic signal is sent and the moment the ultrasonic signal returned from the primary sound source is received by each of the plurality of microphones; or sending, by the ultrasonic generator arranged in the device for recording sound, an ultrasonic signal, and receiving, by each microphone of the matrix of the plurality of microphones, an ultrasonic signal returned from the primary sound source, and determining the microphone which receives the ultrasonic signal returned from the primary sound source first as the microphone which is closest to the primary sound source.

It is to be noted that the ultrasonic generator is located in the middle of the matrix of the plurality of microphones and the ultrasonic receiving part of each microphone is within a range in which the ultrasonic can be sent and received. When the device for recording sound is arranged in a mobile terminal, a speaker of the mobile terminal serves as the ultrasonic generator. Moreover, when the microphones of the matrix of the plurality of microphones are capable of receiving the ultrasonic signal, the microphones serve as ultrasonic receivers. When the microphones of the matrix of the plurality of microphones are incapable of receiving the ultrasonic signal, an ultrasonic receiver is arranged on each microphone of the matrix of the plurality of microphones.

In Step S102, the microphone which is closest to the primary sound source is taken as the current primary microphone and other microphones of the matrix of the plurality of microphones are taken as secondary microphones. The primary microphone is used to collect the primary sound source, and the secondary microphones are used to collect ambient noise.

In the embodiments of the disclosure, after the microphone which is closest to the primary sound source is taken as the current primary microphone and other microphones of the matrix of the plurality of microphones are taken as secondary microphones, the audio processing module detects whether an audio signal is collected by the current primary microphone. When it is determined that no audio signal has been collected by the current primary microphone and a sound recording process is not ended, the current primary microphone initiates the ultrasonic measurement to reselect a primary microphone.

The above-mentioned solutions of the embodiments of the disclosure are described below in detail in conjunction with accompanying drawings.

Provided that sound is transmitted linearly, the microphone closest to a voice source serves as a primary microphone and the other microphones serve as secondary microphones. In the embodiment of the disclosure, the distance between a sound source and a device for recording sound is measured through an ultrasonic measurement. The microphone that has a shortest distance away from the sound source serves as a primary microphone. The other microphones serve as secondary microphones. In practical applications, if the microphones are capable of receiving the ultrasonic signal, then the microphones can be used to receive an ultrasonic signal. If the microphones are incapable of receiving the ultrasonic signal, then an ultrasonic receiver is attached to each microphone. If the ultrasonic generator is placed in the center of the microphone matrix in the device for recording sound, then the ultrasonic receiving part of each microphone is within a range for sending/receiving ultrasonic. For a terminal like a mobile phone, the speaker of the terminal can also be used as an ultrasonic sending terminal. If the primary microphone receives no signal, then one of the following three situations may occur: first, the sound source stops, second, the sound source is away from the primary microphone, and third, the device for recording sound is away from the sound source. In these cases, a warning should be given to the operator of the device for recording sound, and an ultrasonic signal is generated to perform measure to determine which microphone is closer to the sound source, thereby reselecting a primary microphone and secondary microphones.

Figure 2:
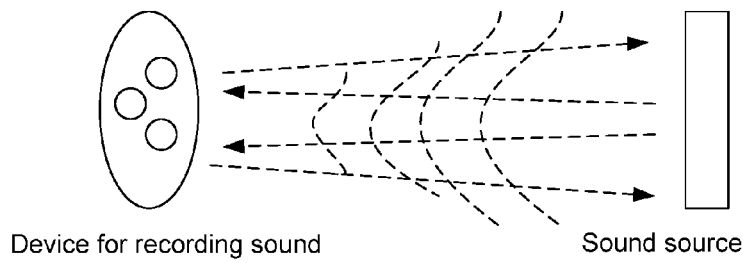
FIG. 2 is a schematic diagram illustrating the ultrasonic distance measurement of a plurality of microphones provided in an embodiment of the disclosure.
Figure 3:
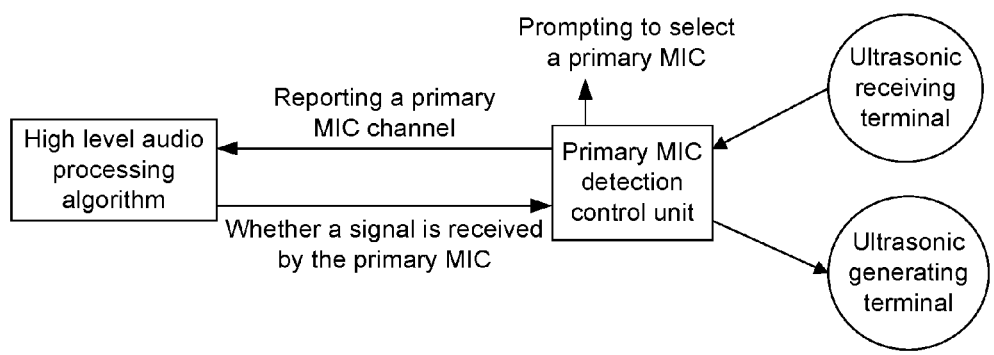
FIG. 3 is a schematic diagram illustrating the working principle of a process for selecting a primary microphone provided in an embodiment of the disclosure.
Figure 4:
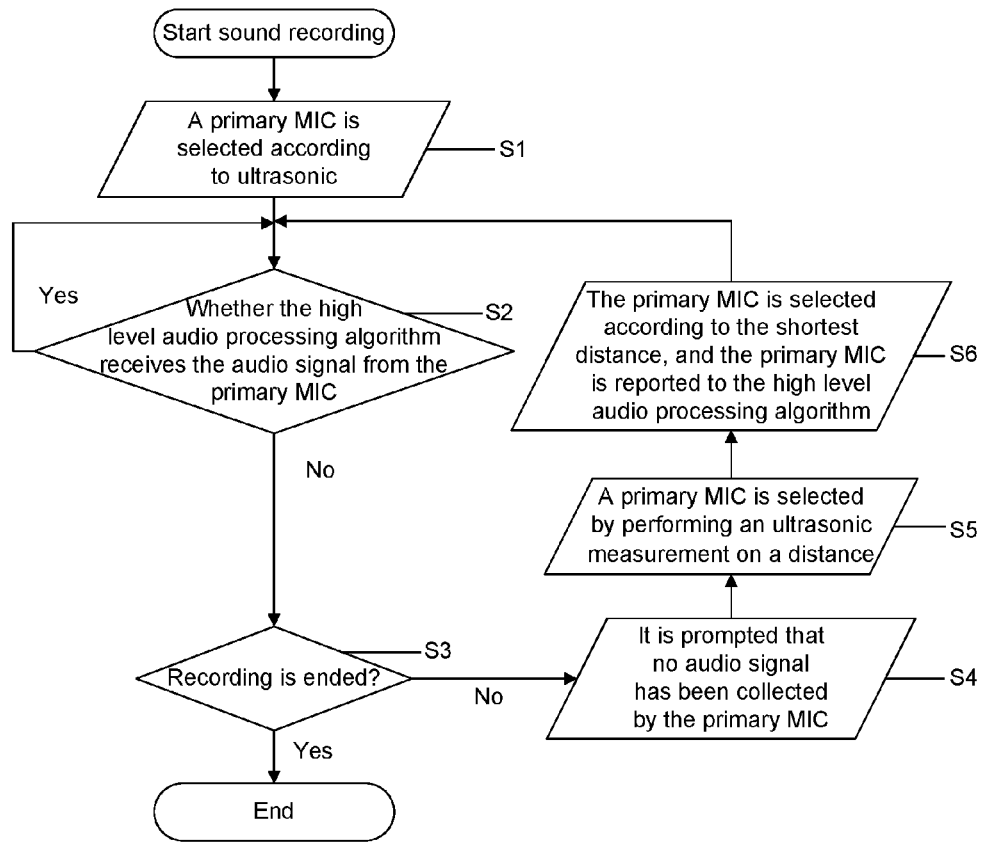
FIG. 4 is a flowchart illustrating a process for selecting a primary microphone provided in an embodiment of the disclosure.

FIG. 2 is a schematic diagram illustrating the ultrasonic distance measurement of a plurality of microphones provided in an embodiment of the disclosure. As shown in FIG. 1, a device for recording sound sends an ultrasonic signal, and microphones receive an ultrasonic signal reflected from a sound source. The microphone closest to the sound source can be determined according to the moment the ultrasonic signal is sent in combination with each moment a reflected ultrasonic signal is received. FIG. 3 is a schematic diagram illustrating the working principle of a process for selecting a primary microphone according to an embodiment of the disclosure. FIG. 4 is a flowchart illustrating a process for selecting a primary microphone according to an embodiment of the disclosure. As shown in FIG. 3, the measurement of the ultrasonic distance to a sound source is initiated by a device for recording sound, and in particular, the measurement is initiated by a high level audio processing algorithm (the foregoing audio processing module) according to detections on whether an audio signal has been collected by a primary microphone. The detected primary microphone is reported to the high level audio processing algorithm. As shown in FIG. 4, the foregoing processing specifically includes the following steps.

In Step S1, when a recording process is started, the operator of a device for recording sound aligns the device for recording sound with a sound source. The microphone which has a shortest linear distance away from the sound source is determined using ultrasonic. The determined microphone is reported to the high level audio processing algorithm.

In Step S2, the high level audio processing algorithm detects whether a voice signal is collected via a primary microphone channel while processing a recorded signal. Step S3 is executed after determining that a voice signal is collected via a primary microphone channel. Otherwise, Step S4 is executed after determining that no voice signal is collected via a primary microphone channel.

In Step S3, whether the recording process is ended is determined. If the recording process is ended, the operation is ended. Otherwise, Step S4 is executed.

In Step S4, a prompt on the fact that the current primary microphone collects no audio signal is given, if no voice signal is collected and the recording job is not ended.

In Step S5, a signal is sent to a primary microphone detection and control unit to select a primary MIC.

In Step S6, the primary microphone detection and control unit starts an ultrasonic sending terminal to send an ultrasonic signal while monitoring an ultrasonic signal received by an ultrasonic receiving terminal, and determine which microphone channel receives an ultrasonic signal first and synchronously report the result of the determination to the high level audio processing algorithm.

In conclusion, according to the solution of the embodiments of the disclosure, the microphone, which is determined to be the closest microphone to a speaker through an ultrasonic measurement, is used as a primary microphone and other microphones are used as microphones for collecting ambient noise, and the ambient noise is deliberately reduced. As such, the problem existing in the conventional art that a primary microphone cannot be selected correctly in a complicated environment can be addressed. Accordingly, an optimal microphone can be selected for voice collection in a complicated environment, and the efficiency of a subsequent audio algorithm can be improved.

Embodiment of Apparatus

Figure 5:
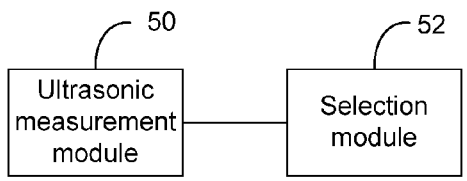
FIG. 5 is a schematic diagram illustrating the structure of an apparatus for selecting a microphone provided in an embodiment of the disclosure.

An apparatus for selecting a microphone is provided in an embodiment of the disclosure. FIG. 5 is a schematic diagram illustrating the structure of an apparatus for selecting a microphone according to the embodiment of the disclosure. As shown in FIG. 5, the microphone selection apparatus according to the embodiment of the disclosure includes an ultrasonic measurement module 50 and a selection module 52. Various modules will be described below in detail with reference to embodiments of the disclosure.

The ultrasonic measurement module 50 is arranged to employ ultrasonic measurement to determine a microphone, which is closest to a primary sound source, of a matrix of a plurality of microphones arranged in a device for recording sound.

Alternatively, the ultrasonic measurement module 50 is specifically arranged to cause an ultrasonic generator arranged in the device for recording sound to send an ultrasonic signal and each microphone of the matrix of the plurality of microphones to receive an ultrasonic signal returned from the primary sound source and determine the microphone which is closest to the primary sound source according to the moment the ultrasonic signal is sent and the moment the ultrasonic signal returned from the primary sound source is received by each of the plurality of microphones. Alternatively, the ultrasonic measurement module 50 is arranged to cause the ultrasonic generator arranged in the device for recording sound to send an ultrasonic signal and each microphone of the matrix of the plurality of microphones to receive an ultrasonic signal returned from the primary sound source and determine the microphone which receives the ultrasonic signal returned from the primary sound source first as the microphone which is closest to the primary sound source.

It is to be noted that the ultrasonic generator is located in the middle of the matrix of the plurality of microphones and the ultrasonic receiving part of each microphone is within a range in which the ultrasonic can be sent and received. When the device for recording sound is arranged in a mobile terminal, a speaker of the mobile terminal serves as the ultrasonic generator. When the microphones of the matrix of the plurality of microphones are capable of receiving the ultrasonic signal, the microphones serve as ultrasonic receivers. When the microphones of the matrix of the plurality of microphones are incapable of receiving the ultrasonic signal, an ultrasonic receiver is arranged on each microphone of the matrix of the plurality of microphones.

As stated above, an ultrasonic receiver for receiving ultrasonic has at least two structures. In a first structure of the two structures, a speaker of the mobile terminal functions as the ultrasonic generator. In a second structure of the two structures, an ultrasonic receiver is arranged on each microphone of the matrix of the plurality of microphones. Here, the mobile terminal may be a terminal device provided with the microphone selection apparatus disclosed in the embodiments of the disclosure. The mobile terminal may be a mobile phone, a tablet computer or another electronic device.

The ultrasonic measurement module 50 and the selection module 52 both specifically structurally include a storage medium and a processor having an information processing function. The processor and the storage medium are connected with each other via an internal interface arranged in the microphone selection apparatus. The internal interface is, for example, a bus interface. Executable instructions are stored on the storage medium. The processor can realize the functions of the ultrasonic measurement module 50 and the selection module 52 by executing the executable instructions.

The processor may be an Application Processor (AP), a Central Processing Unit (CPU), a Microprocessor (MCU), a Digital Signal Processor (DSP), a Programmable Logic Array (PLC) or the like.

The selection module 52 is arranged to take the microphone which is closest to the primary sound source as the current primary microphone and take other microphones of the matrix of the plurality of microphones as secondary microphones. The primary microphone is used to collect the primary sound source, and the secondary microphones are used to collect ambient noise.

The apparatus may further include an initialization module and an audio processing module.

The initialization module is arranged to use the microphone located in the middle of the matrix of the plurality of microphones as the current primary microphone during an initialization process.

The audio processing module is arranged to detect whether an audio signal is collected by the current primary microphone. When it is determined that an audio signal is collected by the current primary microphone, the audio processing module initiates an ultrasonic measurement via the current primary microphone.

Based on the foregoing solutions, the audio processing module is further arranged to detect whether or an audio signal is collected by the current primary microphone after the selection module 52 takes the microphone which is closest to the primary sound source as the current primary microphone and takes other microphones of the matrix of the plurality of microphones as secondary microphones. When it is determined that no audio signal is collected by the current primary microphone and a sound recording process is not ended, the audio processing module causes the current primary microphone to initiate an ultrasonic measurement to reselect a primary microphone.

The specific structures of the initialization module and the audio processing module may be corresponding to that of the foregoing types of processors.

In conclusion, according to the solution of the embodiments of the disclosure, the microphone, which is determined to be the closest microphone to a speaker through an ultrasonic measurement, is used as a primary microphone and other microphones are used as microphones for collecting ambient noise, and the ambient noise is deliberately reduced. As such, the problem existing in the conventional art that a primary microphone cannot be selected correctly in a complicated environment can be addressed. Accordingly, an optimal microphone can be selected for voice collection in a complicated environment, and the efficiency of a subsequent audio algorithm can be improved.

In an embodiment of the disclosure, a computer storage medium is also provided. The computer storage medium stores computer-executable instructions. The computer-executable instructions are used for implement at least one of the solutions of the method embodiments, for example, the technical solution shown in FIG. 1 and/or the solution shown in FIG. 4.

The computer storage medium may be a medium capable of storing program codes, for example, a Read-Only Memory (ROM), a Random Access Memory (RAM), a diskette or a compact disc.

The above is merely preferred embodiments of the disclosure but is not to be construed as limiting the scope of the disclosure. Any modifications devised based on the principle of the disclosure should fall within the scope of protection the disclosure.

What is claimed is:

1. A method for selecting a microphone, comprising:
   employing ultrasonic measurement to determine a microphone, which is closest to a primary sound source, of a matrix of a plurality of microphones arranged in a device for recording sound; and
   taking the microphone which is closest to the primary sound source as the current primary microphone, and taking other microphones of the matrix of the plurality of microphones as secondary microphones, wherein the primary microphone is used to collect the primary sound source, and the secondary microphones are used to collect ambient noise;
   wherein before the step of employing ultrasonic measurement to determine a microphone, which is closest to a primary sound source, of a matrix of a plurality of microphones arranged in a device for recording sound, the method further comprises:
      using the microphone located in the middle of the matrix of the plurality of microphones as the current primary microphone during an initialization process; and
      detecting, by an audio processing module, whether an audio signal is collected by the current primary microphone, and when determining that the audio signal is collected by the current primary microphone, initiating, by the current primary microphone, the ultrasonic measurement.

2. The method according to claim 1, wherein the step of employing ultrasonic measurement to determine a microphone, which is closest to a primary sound source, of a matrix of a plurality of microphones arranged in a device for recording sound comprises:
   sending, by an ultrasonic generator arranged in the device for recording sound, an ultrasonic signal to the primary sound source, and receiving, by each microphone of the matrix of the plurality of microphones, an ultrasonic signal returned from the primary sound source, and determining the microphone which is closest to the primary sound source according to the moment the ultrasonic signal is sent and the moment the ultrasonic signal returned from the primary sound source is received by each of the plurality of microphones.

3. The method according to claim 2, wherein the ultrasonic generator is located in the middle of the matrix of the plurality of microphones, an ultrasonic receiving part of each microphone is within a range in which the ultrasonic signal can be sent and received; and if the device for recording sound is arranged in a mobile terminal, a speaker of the mobile terminal serves as the ultrasonic generator.

4. The method according to claim 2, wherein when the microphones of the matrix of the plurality of microphones receive the ultrasonic signal, the microphones function as ultrasonic receivers; and when the microphones of the matrix of the plurality of microphones do not receive the ultrasonic signal, an ultrasonic receiver is arranged on each microphone of the matrix of the plurality of microphones.

5. The method according to claim 1, wherein after the step of taking the microphone which is closest to the primary sound source as the current primary microphone and taking other microphones of the matrix of the plurality of microphones as secondary microphones, the method further comprises:
   detecting, by the audio processing module, whether an audio signal is collected by the current primary microphone, and when determining that no audio signal is collected by the current primary microphone and a sound recording process is not ended, initiating, by the current primary microphone, the ultrasonic measurement to reselect a primary microphone.

6. An apparatus for selecting a microphone, comprising:
   at least one processor executing computer readable instructions to implement a plurality of modules, the plurality of modules including an ultrasonic measurement module, a selection module, an initialization module and an audio processing module, wherein:
      the ultrasonic measurement module is arranged to employ ultrasonic measurement to determine a microphone, which is closest to a primary sound source, of a matrix of a plurality of microphones arranged in a device for recording sound;
      the selection module is arranged to take the microphone which is closest to the primary sound source as the current primary microphone and take other microphones of the matrix of the plurality of microphones as secondary microphones, wherein the primary microphone is used to collect the primary sound source, and the secondary microphones are used to collect ambient noise;

the initialization module is arranged to use the microphone located in the middle of the matrix of the plurality of microphones as the current primary microphone during an initialization process; and the audio processing module is arranged to detect whether an audio signal is collected by the current primary microphone, and when determining that the audio signal is collected by the current primary microphone, initiate the ultrasonic measurement via the current primary microphone.

7. The apparatus according to claim 6, wherein the ultrasonic measurement module is arranged to:

cause an ultrasonic generator arranged in the device for recording sound to send an ultrasonic signal to the primary sound source and cause each microphone of the matrix of the plurality of microphones to receive an ultrasonic signal returned from the primary sound source, and determine the microphone which is closest to the primary sound source according to the moment the ultrasonic signal is sent and the moment the ultrasonic signal returned from the primary sound source is received by each of the plurality of microphones.

8. The apparatus according to claim 7, wherein the ultrasonic generator is located in the middle of the matrix of the plurality of microphones, an ultrasonic receiving part of each microphone is within a range in which the ultrasonic signal can be sent and received; and when the device for recording sound is arranged in a mobile terminal, a speaker of the mobile terminal serves as the ultrasonic generator.

9. The apparatus according to claim 7, wherein when the microphones of the matrix of the plurality of microphones receive the ultrasonic signal, the microphones serve as ultrasonic receivers;

an ultrasonic receiver is arranged on each microphone of the matrix of the plurality of microphones; and the ultrasonic receiver is arranged to receive the ultrasonic signal when the microphones of the matrix of the plurality of microphones do not receive the ultrasonic signal.

10. The apparatus according to claim 6, wherein the audio processing module is further arranged to, when the selection module takes the microphone which is closest to the primary sound source as the current primary microphone and take other microphones of the matrix of the plurality of microphones as secondary microphones, detect whether an audio signal is collected by the current primary microphone, and when determining that no audio signal is collected by the current primary microphone and a sound recording process is not ended, cause the current primary microphone to initiate the ultrasonic measurement to reselect a primary microphone.

11. A non-transitory computer storage medium having stored computer-executable instructions for executing a method for selecting a microphone, the method comprising:

employing ultrasonic measurement to determine a microphone, which is closest to a primary sound source, of a matrix of a plurality of microphones arranged in a device for recording sound; and taking the microphone which is closest to the primary sound source as the current primary microphone, and taking other microphones of the matrix of the plurality of microphones as secondary microphones, wherein the primary microphone is used to collect the primary sound source, and the secondary microphones are used to collect ambient noise;

wherein before the step of employing ultrasonic measurement to determine a microphone, which is closest to a primary sound source, of a matrix of a plurality of microphones arranged in a device for recording sound, the method further comprises:

using the microphone located in the middle of the matrix of the plurality of microphones as the current primary microphone during an initialization process; and detecting, by an audio processing module, whether an audio signal is collected by the current primary microphone, and when determining that the audio signal is collected by the current primary microphone, initiating, by the current primary microphone, the ultrasonic measurement.

12. The method according to claim 1, wherein the step of employing ultrasonic measurement to determine a microphone, which is closest to a primary sound source, of a matrix of a plurality of microphones arranged in a device for recording sound comprises:

sending, by an ultrasonic generator arranged in the device for recording sound, an ultrasonic signal to the primary sound source, receiving, by each microphone of the matrix of the plurality of microphones, an ultrasonic signal returned from the primary sound source, and determining the microphone which receives the ultrasonic signal returned from the primary sound source first as the microphone which is closest to the primary sound source.

13. The method according to claim 12, wherein the ultrasonic generator is located in the middle of the matrix of the plurality of microphones, an ultrasonic receiving part of each microphone is within a range in which the ultrasonic signal can be sent and received; and if the device for recording sound is arranged in a mobile terminal, a speaker of the mobile terminal serves as the ultrasonic generator.

14. The method according to claim 12, wherein when the microphones of the matrix of the plurality of microphones receive the ultrasonic signal, the microphones function as ultrasonic receivers; and when the microphones of the matrix of the plurality of microphones do not receive the ultrasonic signal, an ultrasonic receiver is arranged on each microphone of the matrix of the plurality of microphones.

15. The apparatus according to claim 6, wherein the ultrasonic measurement module is arranged to:

cause an ultrasonic generator arranged in the device for recording sound to send an ultrasonic signal to the primary sound source and cause each microphone of the matrix of the plurality of microphones to receive an ultrasonic signal returned from the primary sound source, and determine the microphone, which receives the ultrasonic signal returned from the primary sound source first, as the microphone which is closest to the primary sound source.

16. The apparatus according to claim 15, wherein the ultrasonic generator is located in the middle of the matrix of the plurality of microphones, an ultrasonic receiving part of each microphone is within a range in which the ultrasonic signal can be sent and received; and when the device for recording sound is arranged in a mobile terminal, a speaker of the mobile terminal serves as the ultrasonic generator.

17. The apparatus according to claim 15, wherein when the microphones of the matrix of the plurality of microphones receive the ultrasonic signal, the microphones serve as ultrasonic receivers;

an ultrasonic receiver is arranged on each microphone of the matrix of the plurality of microphones; and the ultrasonic receiver is arranged to receive the ultrasonic signal when the microphones of the matrix of the plurality of microphones do not receive the ultrasonic signal.

\* \* \* \* \*